US012628742B2

(12) United States Patent
Mohr

(10) Patent No.: US 12,628,742 B2
(45) Date of Patent: May 19, 2026

(54) RAKE FRAME WITH HINGE JOINT CONNECTING FRONT AND REAR FRAME SECTIONS

(71) Applicant: Ogden Metalworks, Inc., Ogden, IL (US)

(72) Inventor: Calvin Mohr, Ogden, IL (US)

(73) Assignee: Ogden Metalworks, Inc., Ogden, IL (US)

( * ) Notice: Subject to any disclaimer, the term of this patent is extended or adjusted under 35 U.S.C. 154(b) by 981 days.

(21) Appl. No.: 17/332,430

(22) Filed: May 27, 2021

(65) Prior Publication Data

US 2021/0368673 A1 Dec. 2, 2021

Related U.S. Application Data

(60) Provisional application No. 63/030,394, filed on May 27, 2020.

(51) Int. Cl.
*A01D 78/14* (2006.01)
*A01D 78/10* (2006.01)

(52) U.S. Cl.
CPC ......... *A01D 78/1014* (2013.01); *A01D 78/14* (2013.01); *A01D 78/146* (2013.01)

(58) Field of Classification Search
CPC ...... A01D 78/00–78/20; A01D 80/005; A01D 51/00–51/007; A01D 80/00–80/02; A01D 84/00–84/02; A01B 63/00–63/32; A01B 73/00–73/067
See application file for complete search history.

(56) References Cited

U.S. PATENT DOCUMENTS

| | | | | | |
|---|---|---|---|---|---|
| 3,961,469 | A | * | 6/1976 | McRobert | A01D 51/00 15/82 |
| 8,146,338 | B1 | * | 4/2012 | Cicci | A01D 78/146 56/385 |
| 8,186,140 | B1 | * | 5/2012 | Cicci | A01D 78/146 56/377 |
| 9,167,746 | B2 | | 10/2015 | Bassett et al. | |
| 10,499,567 | B2 | * | 12/2019 | Schiferl | A01D 78/14 |
| 2012/0117935 | A1 | * | 5/2012 | Cicci | A01D 78/146 56/366 |
| 2013/0263567 | A1 | * | 10/2013 | Bassett | A01D 78/14 56/397 |
| 2018/0035598 | A1 | * | 2/2018 | Wenger | A01D 34/04 |
| 2018/0317390 | A1 | * | 11/2018 | Schiferl | A01D 78/14 |

FOREIGN PATENT DOCUMENTS

NL 9402063 A * 7/1996 ........... A01D 78/001

* cited by examiner

*Primary Examiner* — Joseph M Rocca
*Assistant Examiner* — Madeline I Runco
(74) *Attorney, Agent, or Firm* — McCarter & English, LLP

(57) ABSTRACT

A rake frame subassembly includes a front frame segment and a rear frame segment connected by a hinge joint having two or more hinges and an adjustment element. The hinge joint connects or is configured to connect the front frame section and the rear frame section. The hinge joint is also configured to enable both an orientation of the rear frame section relative to the front frame section and a position of the rear frame section relative to the front frame section to be adjusted using the adjustment element, or is configured to enable a position of the rear frame section relative to the front frame section to be adjusted using the adjustment element.

20 Claims, 12 Drawing Sheets

RAKE FRAME WITH HINGE JOINT CONNECTING FRONT AND REAR FRAME SECTIONS

RELATED APPLICATION

This application claims priority to and benefit of U.S. Provisional Patent Application Ser. No. 63/030,394, filed May 27, 2020, which is hereby incorporated by reference in its entirety.

BACKGROUND

Conventional carted wheel rakes often have all rake wheels on one side (e.g., the left side or the right side) of the center frame supported by a common support member or beam. An orientation of the common support member relative to a direction of travel is used to control a raking width, as determined by a lateral position of a front rake wheel relative to the direction of travel, a windrow width, as determined by a lateral position of a rear rake wheel relative to the direction of travel, and orientations of the rake wheels relative to the direction of travel; however, the raking width, the windrow width, and the rake wheel orientations cannot independently be varied by changing an orientation of the support member. For example, a change in orientation of the common support member cannot increase the raking width while keeping the windrow width the same, or increase the raking width while increasing the windrow width. As another example, a change in the orientation of the common support beam cannot decrease the raking width while decreasing the windrow width, or decrease a wheel angle while decreasing the windrow width.

SUMMARY

Example embodiments describe herein include, but are not limited to, a rake frame assembly, a rake frame subassembly and a hinge joint for use with a rake frame subassembly that enables an adjustment of both an orientation and a displacement of a rear frame segment supporting one or more rear rake wheel relative to a front frame segment supporting one or more front rake wheels, or that enables a displacement of the rear frame segment relative to the front frame segment.

An embodiment includes rake frame subassembly including: a front frame section configured to support at least one front rake wheel; a rear frame section configured to support at least one rear rake wheel; and a hinge joint having two or more hinges and including an adjustment element. Each of the two or more hinges has an axis of rotation that does not overlay an axis of rotation of others of the two or more hinges. The hinge joint connects or is configured to connect the front frame section and the rear frame section. The hinge joint is also configured to: enable both an orientation of the rear frame section relative to the front frame section and a position of the rear frame section relative to the front frame section to be adjusted using the adjustment element; or enable a position of the rear frame section relative to the front frame section to be adjusted using the adjustment element.

In some embodiments, the hinge joint connects or is configured to connect a trailing end of the front frame section and a leading end of the rear frame section.

In some embodiments, the two or more hinges include four hinges.

In some embodiments, the two or more hinges include a first hinge, a second hinge, a third hinge, and a fourth hinge. The hinge joint includes: a first hinge plate connected to, attached to, integral with, configured to connect to, or configured to be integral with an inner side of front frame section at the trailing end; a second hinge plate connected to, attached to, integral with, configured to connect to, or configured to be integral with an outer side of the front frame section at the trailing end; a third hinge plate connected to, attached to, integral with, configured to connect to, or configured to be integral with an inner side of the rear frame section at the leading end; and a fourth hinge plate connected to, attached to, integral with, configured to connect to, or configured to be integral with an outer side of the rear frame section at the leading end. The hinge joint also includes: at least one inner control arm, a first end of the at least one inner control arm rotatably connected with or configured to rotatably connect with the first hinge plate at the first hinge, a second end of the at least one control arm rotatably connected with or configured to rotatably connect with third hinge plate at the third hinge; and at least one outer control arm, a first end of the at least one outer control arm rotatably connected with or configured to rotatably connect with the second hinge plate at the second hinge, and a second end of the at least one outer control arm rotatably connected with or configured to rotatably connect with the fourth hinge plate at the fourth hinge. The adjustment element is configured to adjust a distance between the first hinge and the fourth hinge.

In some embodiments, the at least one inner control arm includes a pair of inner control arms oriented parallel to each other; and the at least one outer control arm includes a pair of outer control arms oriented parallel to each other.

In some embodiments, the first hinge plate and the second hinge plate are attached to each other or integral with each other, and wherein the third hinge plate and the fourth hinge plate are attached to each other or integral with each other.

In some embodiments, the rake frame subassembly also includes: a first hinge pin associated with the first hinge; a second hinge pin associate with the second hinge; a third hinge pin associated with the third hinge; and a fourth hinge pin associated with the fourth hinge.

In some embodiments, each of the first hinge pin, the second hinge pin, the third hinge pin, and the fourth hinge pin is a screw or a bolt.

In some embodiments, a first distance between the first hinge and the second hinge is greater than a second distance between the third hinge and the fourth hinge.

In some embodiments, a first distance between the first hinge and the second hinge is the same as a second distance between the third hinge and the fourth hinge.

In some embodiments, the adjustment element includes one or more of a turnbuckle, a first element defining a series of holes and a second element configured to engage one or more of the series of holes, a hydraulically controlled element, and an electronically controlled element.

An embodiment is a rake frame assembly including: any of the rake frame subassemblies described or disclosed herein; one or more front rake arms attached to or configured to attach to the inner side of the front rake section or to the outer side of the front frame section; and one or more rear rake arms attached to or configured to attach to the inner side of the rear frame section or to the outer side of the rear frame section.

In some embodiments, the rake frame assembly further includes: one or more front rake wheels corresponding to the one or more front rake wheel arms; and one or more rear rake wheels corresponding to the one or more rear rake wheel arms.

In some embodiments, the one or more front rake wheels include a plurality of front rake wheels; or the one or more rear rake wheels include a plurality of rear rake wheels; or the one or more front rake wheels include a plurality of front rake wheels and the one or more rear rake wheels include a plurality of rear rake wheels.

An embodiments is a hinge joint configured to connect a trailing end of a front frame section of a rake frame subassembly and a leading end of a rear frame section of the rake frame subassembly, the hinge joint having a first hinge, a second hinge, a third hinge, and a fourth hinge. The hinge joint including: a first hinge plate configured to connect to or be attached to an inner side of front frame section at the trailing end; a second hinge plate configured to connect to or be attached to an outer side of the front frame section at the trailing end; a third hinge plate configured to connect to or be attached to the inner side of the rear frame section at the leading end; and a fourth hinge plate configured to connect to or be attached to the outer side of the rear frame section at the leading end. The hinge joint also includes at least one inner control arm, a first end of the at least one inner control arm rotatably connected with or configured to rotatably connect with the first hinge plate at the first hinge, a second end of the at least one control arm rotatably connected with or configured to rotatably connect with third hinge plate at the third hinge; at least one outer control arm, a first end of the at least one outer control arm rotatably connected with or configured to rotatably connect with the second hinge plate at the second hinge, and a second end of the at least one outer control arm rotatably connected with or configured to rotatably connect with the fourth hinge plate at the fourth hinge; and an adjustment element configured to adjust a distance between the first hinge and the fourth hinge, thereby adjusting a position of the rear frame section relative to the front frame section, or thereby adjusting both an orientation of the rear frame section relative to the front frame section and a position of the rear frame section relative to the front frame section.

BRIEF DESCRIPTION OF THE DRAWINGS

The drawings are intended to illustrate aspects and embodiments described herein and are not intended to show relative sizes and dimensions, or to limit the scope of examples or embodiments. In the drawings, the same numbers are used throughout the drawings to reference like features and components of like function.

DETAILED DESCRIPTION

Figure 1:
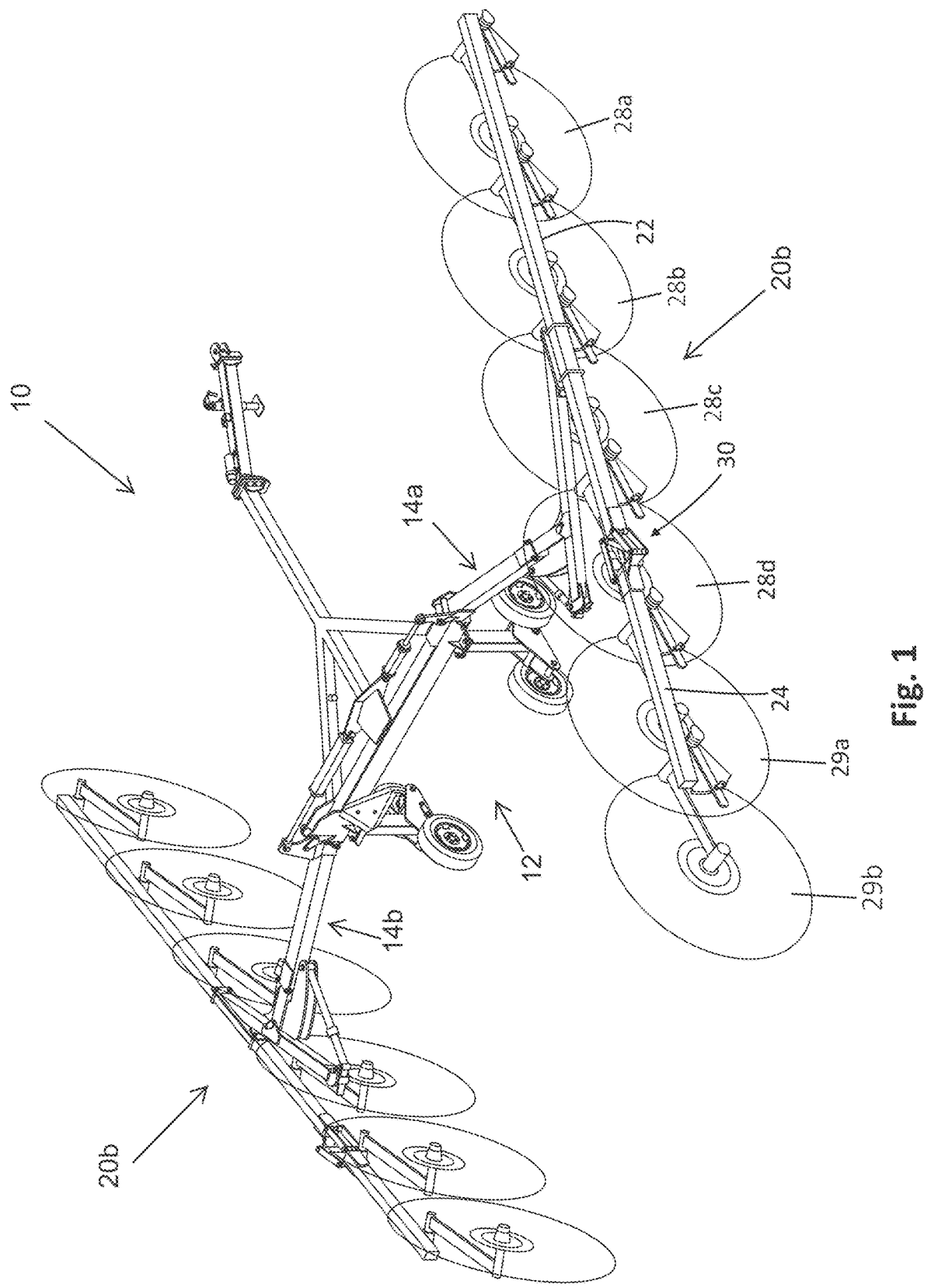
FIG. 1 is a perspective view of a hay rake or carted rake including a center frame, two wings, and two rake frame subassemblies in accordance with some embodiments.

Some embodiments are directed to rake frames, rake frame assemblies, rake frame subassemblies, and hinge joints for use in hay rakes, rake frames, rake frame assemblies, and rake frame subassemblies. In some embodiments, a hinge joint includes two or more hinges, each hinge having an axis of rotation that does not overlay an axis of rotation of others of the two or more hinges. The hinge joint connects or is configured to connect a front frame section of a rake frame subassembly that is configured to support at least one front rake wheel and a rear frame section of a rake frame subassembly that is configured to support at least one rear rake wheel. The hinge joint includes an adjustment element.

In some embodiments, the hinge joint is configured to enable both an orientation of the rear frame section to be adjusted relative to an orientation of the front frame section using the adjustment element and a position of the rear frame section to be adjusted relative to a position of the front frame section (e.g., via a displacement or translation) using the adjustment element. In some embodiments, the hinge joint is configured to enable a position of the rear frame section to be adjusted relative to a position of the front frame section (e.g., via a displacement or translation) using the adjustment element. As each rake frame section supports one or more rake wheels when in use, by adjusting the position or the position and orientation of the rear frame section with respect to the front frame section, a user can adjust the relative positions and orientations of the rake wheels that are supported by the front and rear frame sections.

In some embodiments, the hinge joint enables adjustment of wheel angles of the one or more front rake wheels relative to wheel angles of the one or more rear rake wheels.

In some embodiments, the hinge joint including two or more hinges provides a greater range of motion for inward deflection of the rear frame section relative to the front frame section without interference of the at least one front rake wheel with the at least one rear rake wheel than would be provided by a simple hinge with a single pivot.

In some embodiments, the hinge joint including two or more hinges has better strength than a simple hinge with a single pivot point.

As used herein, the term "inside" or "inner" refers to a position relatively toward a center frame of the rake during use. The inner side or the inner surface of the front frame section and rear second frame section refers to surfaces of the front frame section and the rear frame section that face toward the center frame during use. The inner control arms or inside control arms are the control arms that are attached to or integral with the side or surface of the front and rear frame sections facing the center frame during use. Similarly, the term "inwardly" means towards or in a direction closer to the center frame during use.

As used herein, the term "outside" or "outer" refers to a position relatively away from the center frame of the rake during use. The outer side or the outer surface of the front frame section and rear second frame section refers to surfaces of the front frame section and the rear frame section that face away from the center frame of the rake during use. Thus, the outside control arms or outer control arms are the control arms that are attached to or integral with the side of the front and rear wheel sections that are facing away from the center frame during use. Similarly, the term "outwardly" means in a direction away from the center frame during use.

FIG. 1 illustrates a hay rake or a carted wheel rake 10 including a center frame 12, a first wing 14a, a second wing 14b, a first rake subassembly 20a, and a second rake subassembly 20 in accordance with some embodiments. The first rake subassembly 20 has a multi-section frame including a front frame section 22 and a rear frame section 24 connected by a hinge joint 30 in accordance with some embodiments. The front frame section 22 is configured to support at least one front rake wheel (e.g., front rake wheels 28a, 28b, 28c, 28d) and the rear frame section is configured to support at least one rear rake wheel (e.g., rear rake wheels 29a, 29b). The hinge joint 30 includes two or more hinges and an adjustment element (see description of FIGS. 2-9 below). In some embodiments, the hinge joint 30 is configured to enable both an orientation of the rear frame section 24 relative to the front frame section 22 to be adjusted using the adjustment element 30 and a position of the rear frame section 24 relative to the front frame section 22 to be adjusted (e.g., a displacement or translation of the rear frame section 24 relative to the front frame section 22) using the adjustment element 30. In some embodiments, the hinge joint 30 is configured enable a position of the rear frame section 24 relative to the front frame section 22 to be adjusted (e.g., via a displacement or translation of the rear frame section 24 relative to the front frame section 22) using the adjustment element 30. Although FIG. 1 illustrates a full hay rake or carted wheel rake 10, a rake subassembly (e.g., first rake subassembly 20a or second rake subassembly 20b) without other elements of the hay rake or carted wheel rake 10 is also an embodiment. Similarly, a hinge joint 30 configured to join front frame section 22 and a second frame section 24 without other elements of the rake frame subassembly is also an embodiment. Although the first rake subassembly 20a is configured such that the front rake wheels 28a, 28b, 28c, 28d are inward of the front frame segment 22 and the rear rake wheels 29a, 29b are inward of the rear frame segment 24, in some embodiments, a rake subassembly is configured such that the at least one front rake wheel is disposed outward of the front frame segment and such that the at least one rear rake wheel is disposed outward of the rear frame segment. Although the first rake subassembly 20a and the second rake subassembly 20b are each configured to support four front rake wheels and two rear rake wheels in FIG. 1. In other embodiments, the front frame segment may support more or fewer than four rake wheels, and that rear frame segment may support more or fewer than two rake wheels. In some embodiments, a number of rake wheels supported by the front rake segment may be different than a number of rake wheels supported by the rear frame segment. In some embodiments, a number of rake wheels supported by the front rake segment may be the same as a number of rake wheels supported by the rear frame segment. For example, a rake subassembly 20 in FIGS. 3-9 (described below) supports two front rake wheels and two rear rake wheels.

Figure 2:
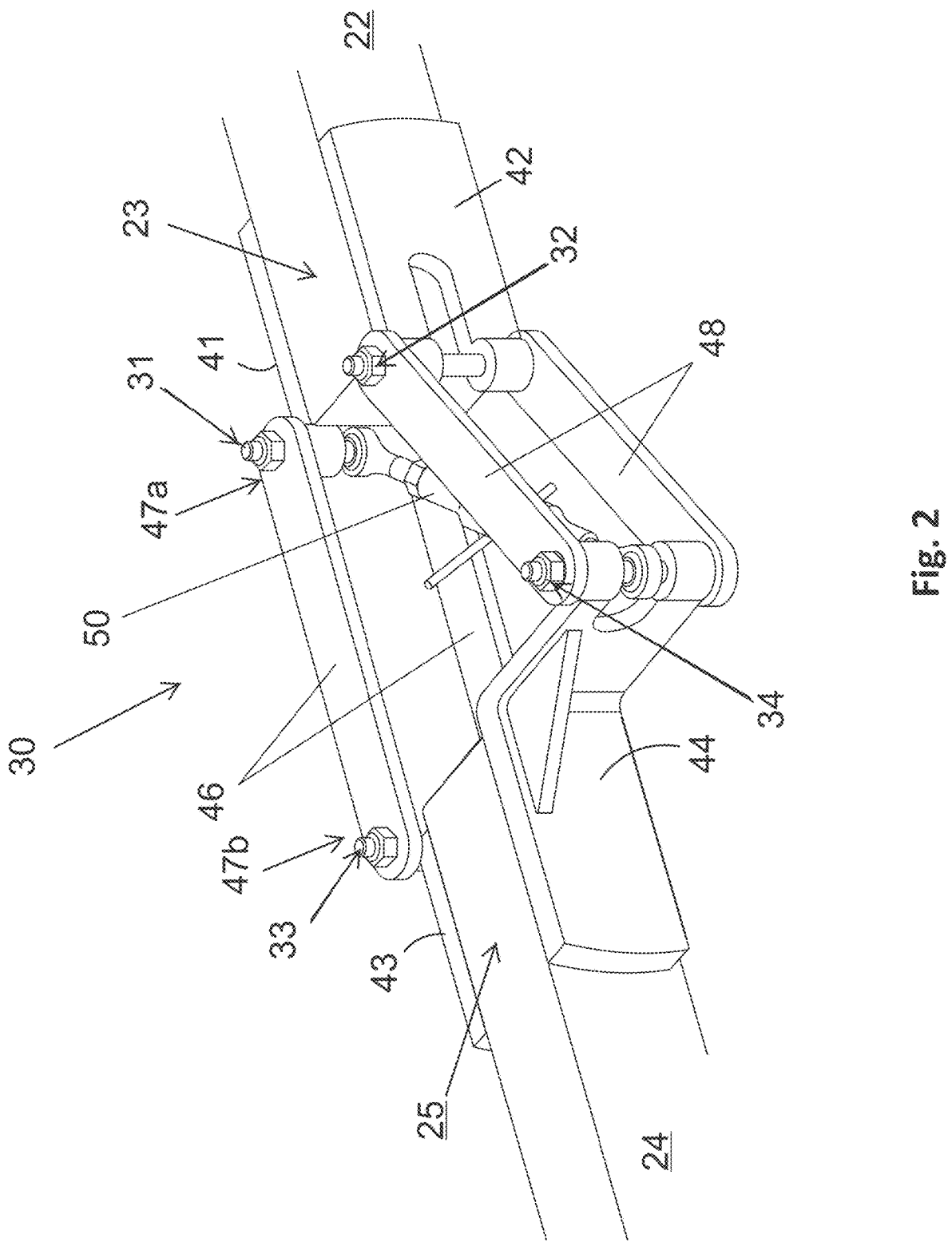
FIG. 2 is an enlarged perspective view of a hinge joint of a rake frame subassembly of in accordance with some embodiments.

As illustrated in the enlarged view of the hinge joint 30 in FIG. 2, the hinge joint 30 connects a trailing end 23 of the front frame section 22 and a leading end 25 of the rear frame section 24 in some embodiments. In some embodiments, the hinge joint 30 includes a first hinge 31, a second hinge 32, a third hinge 33 and a fourth hinge 34.

In some embodiments, the hinge joint 30 comprises a first a first hinge plate 41 connected to, attached to, integral with, configured to connect to, or configured to be integral with an inner side or inward facing surface of the front frame section 22 at the trailing end 23, and a second hinge plate 42 connected to, attached to, integral with, configured to connect to, or configured to be integral with an outer side or outward facing surface of the front frame section 22 at the trailing end 23. In some embodiments, the hinge joint 30 further comprises a third hinge plate 43 connected to, attached to, integral with, configured to connect to, or configured to be integral with an inner side or inward facing surface of the rear frame section 24 at the leading end 25, and a fourth hinge plate 44 connected to, attached to, integral with, configured to connect to, or configured to be integral with an outer side or outward facing surface of the rear frame section 24 at the leading end 25. In some embodiments, the first hinge plate and the second hinge plate are attached to each other or integral with each other. In some embodiments, the third hinge plate and the fourth hinge plate are attached to each other or integral with each other.

In some embodiments, the hinge joint 30 also comprises at least one inner control arm 46 and at least one outer control arm 48. A first end 47a of the at least one inner control arm 46 is rotatably connected with or configured to rotatably connect with the first hinge plate 41 at the first hinge 31 and a second end 47b of the at least one inner control arm 46 is rotatably connected with or configured to rotatably connect with third hinge plate 43 at the third hinge 33. A first end 49a of the at least one outer control arm 48 is rotatably connected with or configured to rotatably connect with the second hinge plate 42 at the second hinge 32, and a second end 49b of the at least one outer control arm 48 is rotatably connected with or configured to rotatably connect with the fourth hinge plate 44 at the fourth hinge 34. In some embodiments, the at least one inner control arm is a pair of inner control arms 46 parallel to each other and the at least one outer control arm is a pair of outer control arms 48 parallel to each other as depicted in FIG. 2. In some embodiments, the pair of inner control arms may be fixedly attached or fixedly connected to each other and the pair of outer control arms may be fixedly attached or fixedly connected to each other.

In some embodiments, the adjustment element is configured to adjust a distance between the first hinge 31 and the fourth hinge 34. In some embodiments, the adjustment element is a turnbuckle 50 as depicted in FIG. 2. In other embodiments, other structures may be employed as an adjustment element for adjusting a distance between the first hinge and the fourth hinge. Such structures include, but are not limited to a first element defining a series of holes and a second element configured to engage one or more of the series of holes, a hydraulically controlled element, and an electronically controlled element.

As illustrated in FIG. 2, in some embodiments, the inner control arms 46 are connected to the front frame section 22 through the first hinge 31 and to the rear frame section 24 through the third hinge 33. The outer control arms 48 are attached to the front frame section 22 through the second hinge 32 and to the rear frame section 24 through the fourth hinge 34. In some embodiments, each of the first hinge 31, second hinge 32, third hinge 33, and fourth hinge 34 includes a respective hinge pin.

In some embodiments, each of the first hinge 31, second hinge 32, third hinge 33, and fourth hinge 34 is formed by hinge pins in the form of hex cap screws passing through terminal knuckles on the corresponding first hinge plate 41, second hinge plate 42, third hinge plate 43, and fourth hinge plate 44 and through apertures in the corresponding inner control arms and outer control arms.

Figure 3:
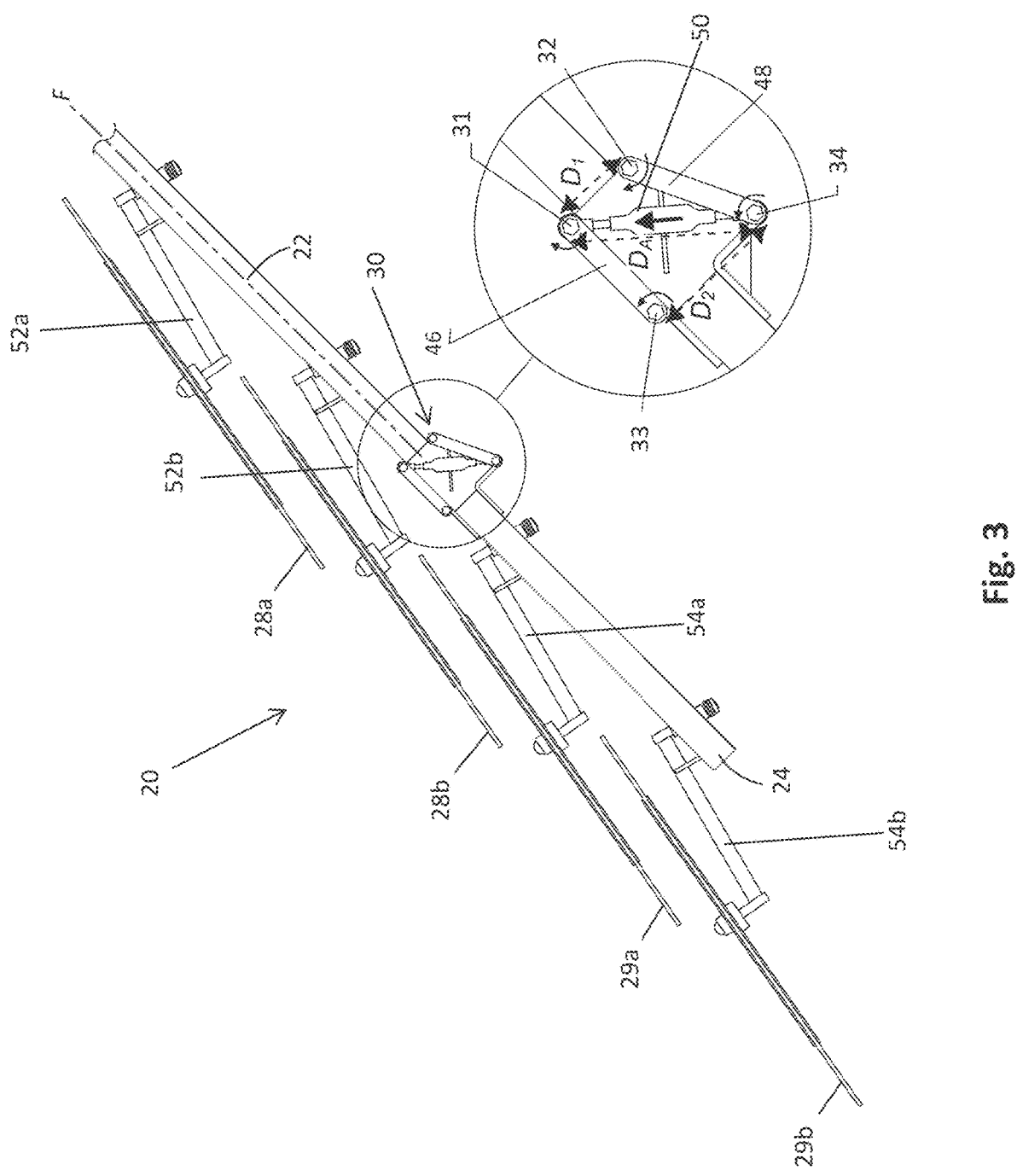
FIG. 3 is top view of a rake frame subassembly and an enlarged top view of a hinge joint of the rake frame subassembly illustrating an adjustment of the distance between the first hinge and the fourth hinge and pivoting of the various hinges when an adjustment element in the form of a turnbuckle is shortened in accordance with some embodiments.

FIG. 3 provides a top view of a rake frame subassembly 20 with a front frame section 22 and a rear frame section 26 connected by a hinge joint 30 and an enlarged view of the hinge joint 30. In some embodiments, a distance $D_A$ between the first hinge 31 and the fourth hinge 34 is used to control both an orientation and a position or displacement of the rear frame section 24 relative to the front frame section 22. In some such embodiments, a distance $D_1$ between the first hinge 31 and the second hinge 32 is different than a distance $D_2$ between the third hinge 33 and the fourth hinge 34 as depicted in FIG. 3.

In some embodiments, a distance $D_A$ between the first hinge 31 and the fourth hinge 34 is used to control a position or displacement of the rear frame section 24 relative to the front frame section 22, but not an orientation of the rear frame section 24 relative to the front frame section 22. In some such embodiments, the distance $D_1$ between the first hinge 31 and the second hinge 32 is the same as the distance $D_2$ between the third hinge 33 and the fourth hinge 34.

As illustrated in the magnified view of the pivot joint 30 in FIG. 3, a shortening of the adjustment element (e.g., turnbuckle 50) causes the inner control arms 46 and outer control arms 48 to pivot in a clockwise direction relative to the front frame section 22 at the first hinge 31 and the second hinge 32, respectively, and causes the inner control arms 46 and the outer control arms 48 to pivot in a counter clockwise direction relative to the rear frame section 24 at the third hinge 33 and the fourth hinge 34, respectively, as illustrated by curved arrows. Because $D_2$ is greater than $D_1$ in the depicted embodiment, this shortening of $D_A$ causes both a change in the orientation of the rear frame section 24 relative to the front frame section 22 tilting inward, and causes a displacement of the rear frame section 24 relative to the front frame section 22 both laterally inward with respect to a longitudinal axis F of the front frame section 22 and forward along the longitudinal axis F of the front frame section 22. This tilts the rear rake wheels 29a, 29b inward relative to the front rake wheels 28a, 28b and changes the angles of the rear rake wheels 29a, 29b relative to the angles of the front rake wheels 28a, 28b and relative to the longitudinal axis F of the front frame section 22 (see FIG. 5).

Figure 4:
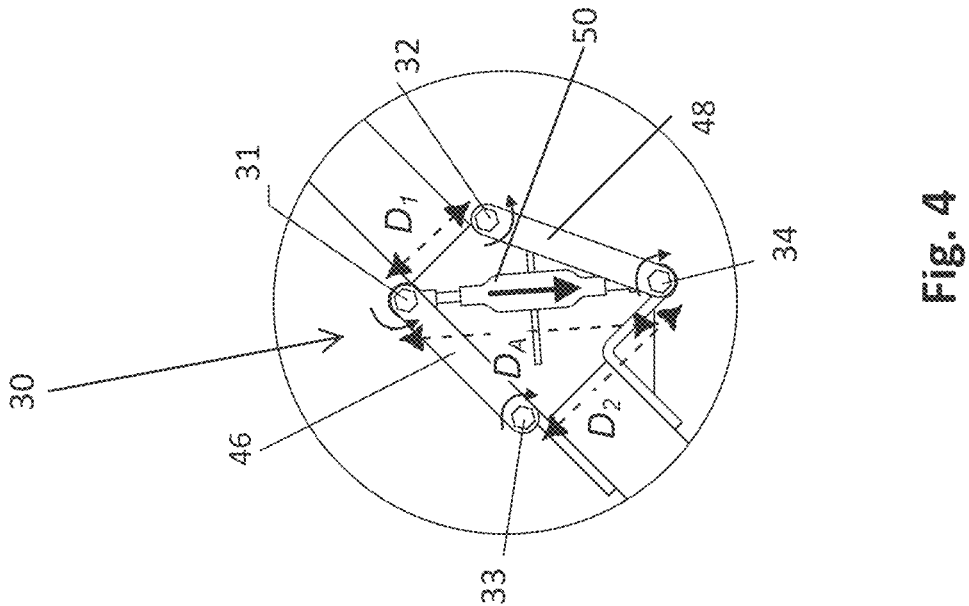
FIG. 4 is an enlarged top view of the hinge joint of the rake frame subassembly of FIG. 3 illustrating an adjustment of the distance between the first hinge and the fourth hinge and pivoting of the various hinges when the adjustment element in the form of a turnbuckle is lengthened in accordance with some embodiments.

FIG. 4 provides a top enlarged view of the hinge joint 30 illustrating a lengthening of the turnbuckle 32 that causes the causes the inner control arms 46 and outer control arms 48 to pivot in a counter clockwise direction relative to the front frame section 22 at the first hinge 31 and the second hinge 32, respectively, and causes the inner control arms 46 and the outer control arms 48 to pivot in a clockwise direction relative to the rear frame section 24 at the third hinge 33 and the fourth hinge 34, respectively, as illustrated by curved arrows. Because $D_2$ is greater than $D_1$ in the depicted embodiment, this lengthening of $D_A$ causes both a change in the orientation of the rear frame section 24 relative to the front frame section 22 tilting outward, and causes a displacement of the rear frame section 24 relative to the front frame section 22 both laterally outward with respect to a longitudinal axis F of the front frame section 22 and forward along the longitudinal axis F of the front frame section 22. This tilts the rear rake wheels 29a, 29b outward relative to the front rake wheels 28a, 28b and changes the angles of the rear rake wheels 29a, 29b relative to the angles of the front rake wheels 28a, 28b and relative to the longitudinal axis F of the front frame section 22 (see FIG. 6).

In some embodiments, wheel rake subassembly 20 also includes one or more front rake arms 52a, 52b attached to or configured to attach to the inner side or surface of the front frame section 22 or to the outer side or surface of the front frame section 22, and one or more rear rake arms 54a, 54b attached to or configured to attach to the inner side or surface of the rear frame section 24 or to the outer side or surface of the rear frame section 24. In some embodiments, each of the one or more front rake arms 52a, 52b is configured to support one or more of the front wheel rakes 28a, 28b, and each of the one or more rear rake arms 54a, 54b is configured to support one or more of the rear wheel rakes 29a, 29b.

Although FIG. 3 depicts the front rake arms 52a, 52b and front rake wheels 28a, 28b disposed inward of the front frame section 22 during use, in some other embodiments, the front rake arms and front rake wheels are disposed outward of the front frame section during use. Although FIG. 3 depicts the rear rake arms 54a, 54b and front rake wheels 29a, 29b disposed inward of the rear frame section 24 during use, in some other embodiments, the rear rake arms and rear rake wheels are disposed outward of the rear frame section during use.

Although FIG. 3 depicts each one of the front rake arms 52*a*, 52*b* and rear rake arms 54*a*, 54*b*, supporting a corresponding one of the front wheel rakes 28*a*, 28*b*, and rear wheel rakes 29*a*, 29*b*, in some other embodiments, a single front rake arm may support multiple front wheel rakes and a single rear rake arm may support multiple rear wheel rakes.

Figures 5, 6:
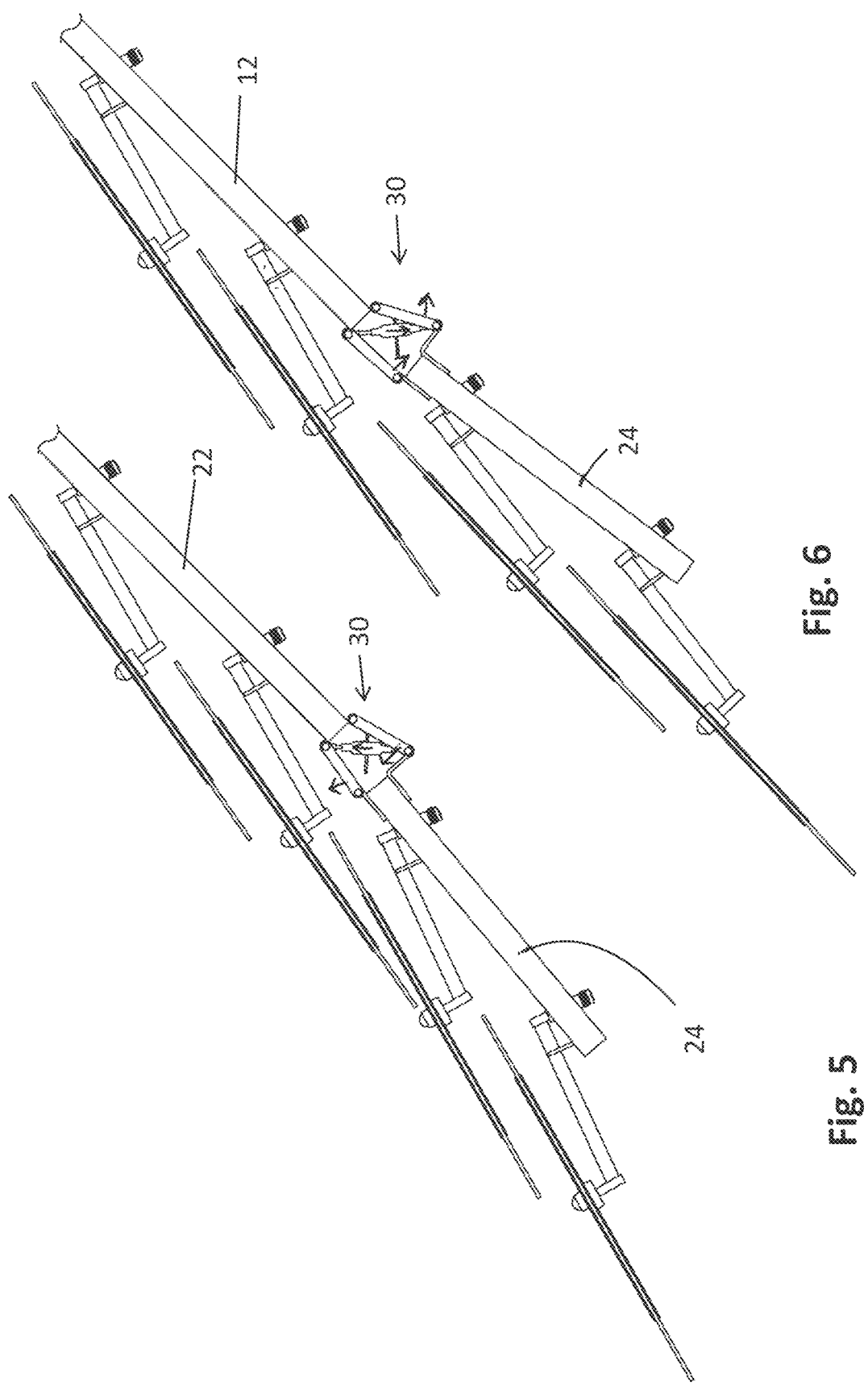
FIG. 5 is a top view of the rake frame subassembly illustrating the positions and orientations of the front frame section and rear frame sections and their associated wheel rakes when the turnbuckle is shorted as shown in FIG. 3 in accordance with some embodiments.
FIG. 6 is an enlarged top view of the hinge joint of the rake frame subassembly of FIG. 3 illustrating an adjustment of the distance between the first hinge and the fourth hinge and pivoting of the various hinges when the adjustment element in the form of a turnbuckle is lengthened in accordance with some embodiments.

FIG. 5 is a top view illustrating the positions and orientations of and rear frame section 24 and rear wheel rakes relative to those of the front frame section 22 and front wheel rakes when the turnbuckle 32 is shorted as shown in FIG. 3.

FIG. 6 is a top view illustrating the positions and orientations of and rear frame section 24 and rear wheel rakes relative to those of the front frame section 22 and front wheel rakes when the turnbuckle 32 is lengthened as shown in FIG. 4.

Figure 7:
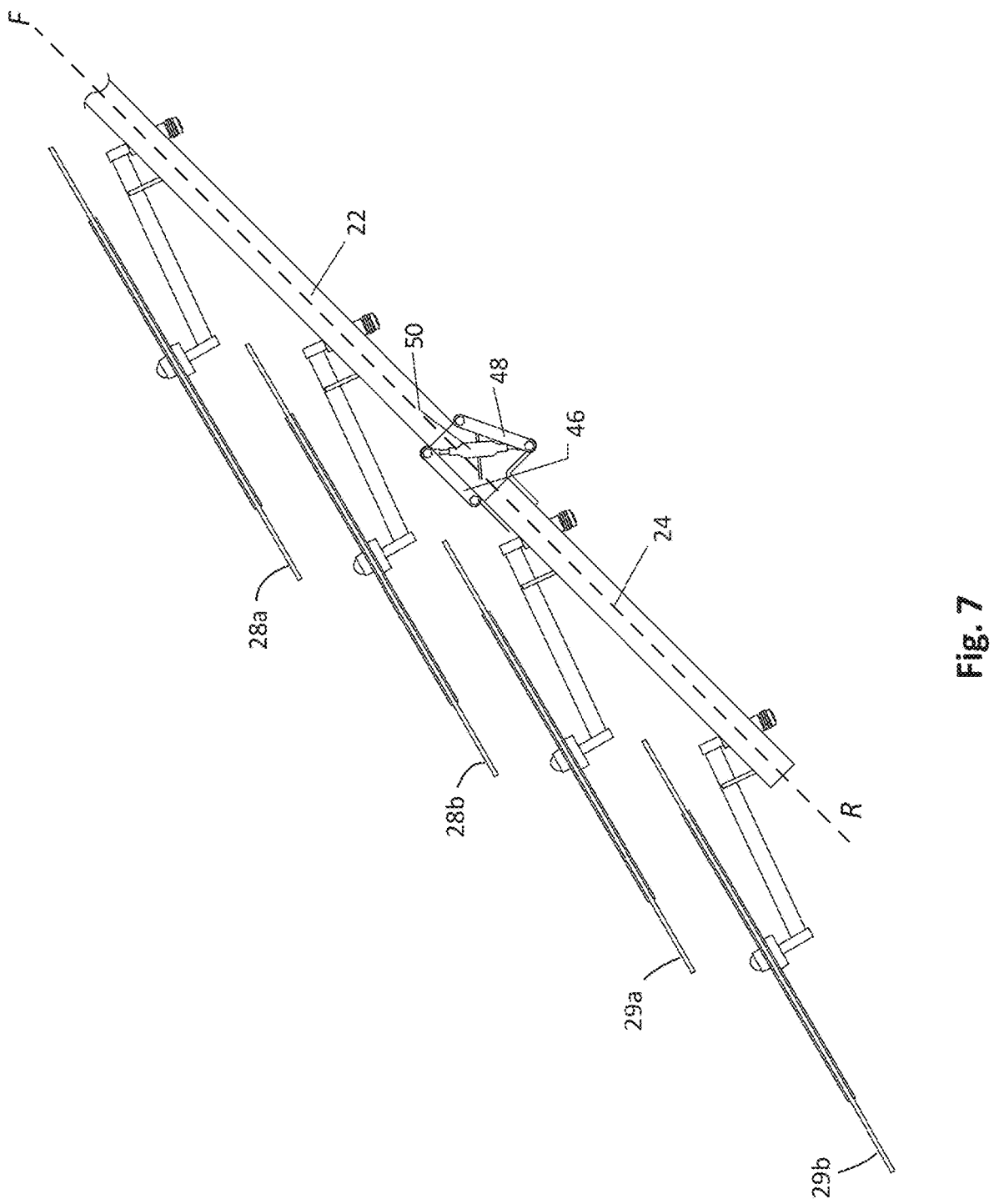
FIG. 7 is a top view of the rake frame subassembly illustrating positions and orientations of the front frame section, the front rake wheels, the rear frame section and the rear rake wheels when the adjustment element (e.g., a turnbuckle) is set in a neutral configuration resulting in the front frame section and rear frame section forming a straight configuration in accordance with some embodiments.
Figure 8:
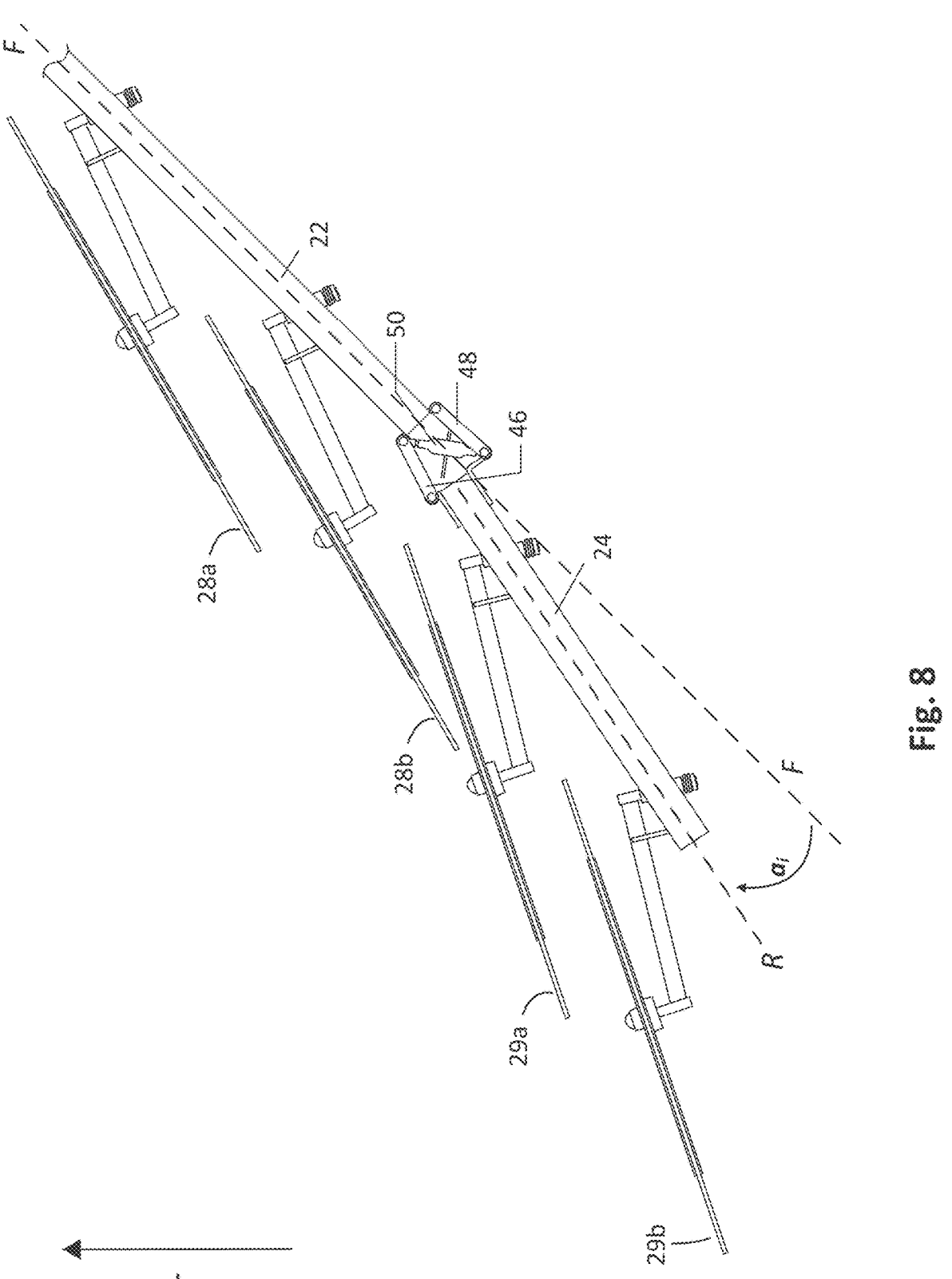
FIG. 8 is a top view of the rake frame subassembly illustrating positions and orientations of the front frame section, the front rake wheels, the rear frame section and the rear rake wheels when the adjustment element (e.g., a turnbuckle) is shortened relative to the neutral configuration causing tilting of the rear frame section inward relative to the front frame section and causing displacement of the rear frame section both laterally inward and forward with respect to the front frame section in accordance with some embodiments.

FIG. 7 illustrates the positions and orientations of the front frame section 22, front wheel rakes 28*a*, 28*b*, rear frame section 22, and rear wheel rakes 29*a*, 29*b* when the adjustment element (e.g., turnbuckle 50) is set for a separation between the first hinge 31 and the fourth hinge 34 corresponding to a neutral position in which a longitudinal axis R of the rear frame section 24 is in line with the longitudinal axis F of front frame section 22 forming a straight configuration.

In the straight configuration both the front frame section 22 and rear frame section 24 are in line, which holds all of the front rake wheels 28*a*, 28*b*, and rear rake wheels 29*a*, 29*b* in a parallel orientation relative to each other in accordance with some embodiments. In some embodiments, in this configuration, the inner control arms 46 are oriented parallel to longitudinal axis F of front frame section and to the longitudinal axis R of the rear frame section as depicted in FIG. 7. In some embodiments, the outer control arms 48 tilt outwardly away from the longitudinal axis R of the rear frame section 26.

FIG. 7 illustrates the positions and orientations of the front frame section 22, front wheel rakes 28*a*, 28*b*, rear frame section 22, and rear wheel rakes 29*a*, 29*b* when the adjustment element (e.g., turnbuckle 50) is shortened from the neutral configuration resulting in the front frame section 22 and rear frame section 24 forming an angle as represented by a*i* between longitudinal axes F and R.

To adjust to an inward position and orientation, the turnbuckle 32 is screwed in, which pulls the outer control arms 48 and tilts them more toward the inside or reduces a tilt toward the outside. The outside control arms 48 pull closer to parallel with the longitudinal axis F of the front frame section as they pivot around the cap screws on the front frame section 22 and rear frame section 24. While the outside control arms 48 adjust inward through pivoting at the second hinge and the fourth hinge, the inside control arms 46 as they pivot about the first hinge and the third hinge. Through operation of the outside control arms 48 and the inside control arms 46, the rear frame section 24 pivots inward and is also displaced laterally inward with respect to the longitudinal axis F of the front frame section. As the rear frame section 24 is pivoted inward and displaced inward with respect the front frame section 22, a lateral position of the rearmost wheel rake 29*b* with respect to a direction of travel T is adjusted inward while a lateral position of the front most wheel rake 28*a* with respect to a direction of travel T remains the same, thereby adjusting (decreasing) the windrow width without changing the raking width.

Figure 9:
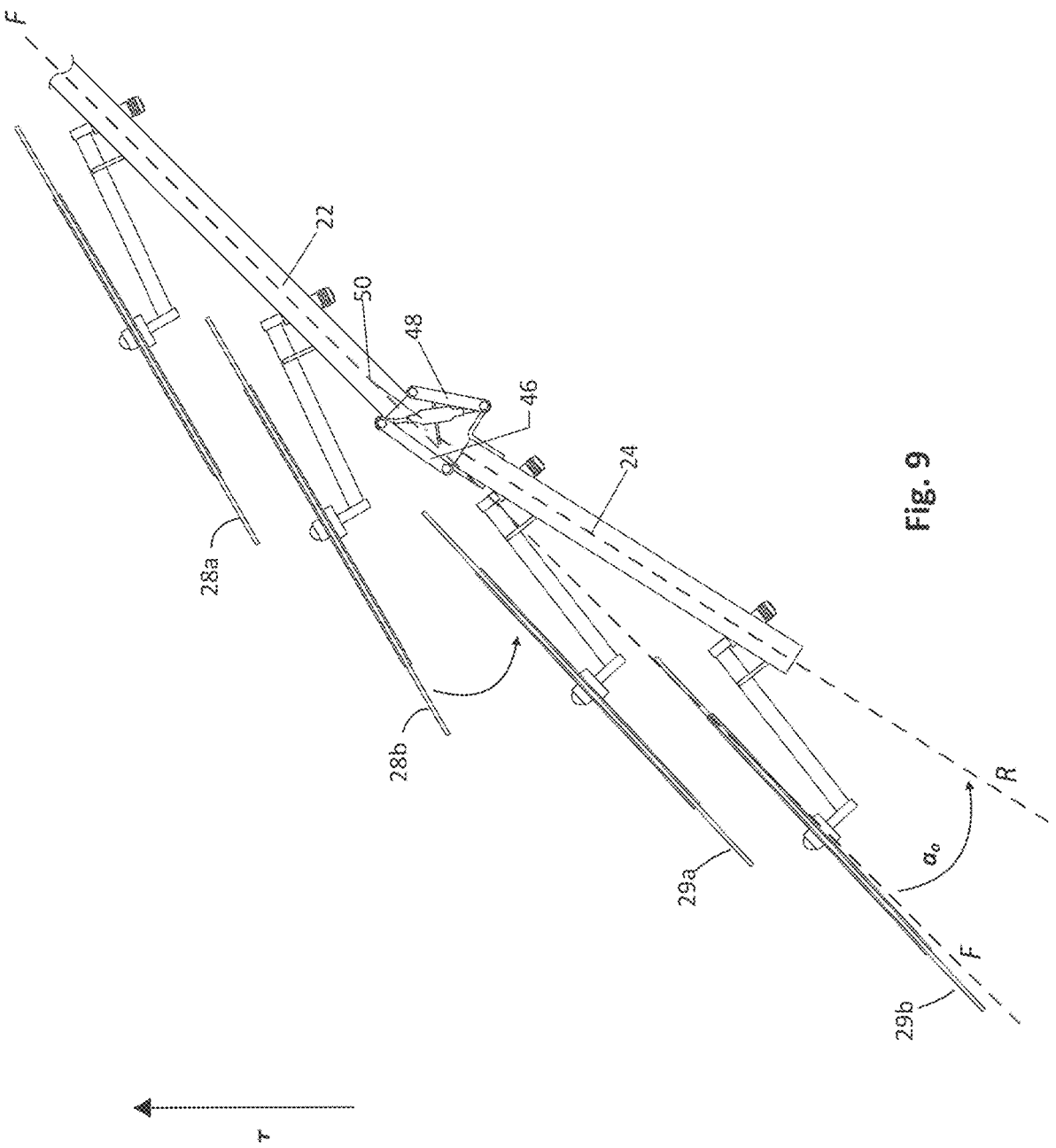
FIG. 9 is a top view of the rake frame subassembly illustrating positions and orientations of the front frame section, the front rake wheels, the rear frame section and the rear rake wheels when the adjustment element (e.g., a turnbuckle) is lengthened relative to the neutral configuration causing tilting of the rear frame section outward relative to the front frame section and causing displacement of the rear frame section both laterally outward and forward with respect to the front frame section in accordance with some embodiments.

FIG. 9 illustrates the outward positions and orientations of the front frame section 22 and rear frame section 24 and their wheel rakes 28*a*, 28*b*, 29*a*, 29*b* when the turnbuckle 50 is lengthened resulting in the front frame section 22 and rear frame section 24 forming an angle as represented by a*o* between longitudinal axes F and R.

To adjust to an outward configuration, the turnbuckle 50 is screwed out lengthening a distance between the first hinge and the fourth hinge, which tilts the outer control arms 48 further outward as they pivot about the second hinge and the fourth hinge. At the same time, the inner control arms 46 pivot about the first hinge and the third hinge. Through operation of the outer control arms 48 and inner control arm 46, the rear frame section 24 tilts outward forming angle a*o* between longitudinal axes F and R, and is displaced laterally outward. As the rear frame section 24 is pivoted outward and displaced outward with respect the front frame section 22, a lateral position of the rearmost wheel rake 29*b* with respect to a direction of travel T is adjusted outward while a lateral position of the front most wheel rake 28*a* with respect to a direction of travel T remains the same, thereby adjusting (increasing) the windrow width without changing the raking width.

One of ordinary skill in the art will appreciate that a disassembled rake frame assembly, a disassembled rake frame subassembly, and a disassembled hinge joint for a rake frame all fall within the scope of the present invention. One of ordinary skill in the art will also appreciate that a rake frame subassembly that does not include rake arms or rake wheels, but is configured to support rake arms and rake wheels, falls within the scope of the present invention.

EXAMPLE

Figure 10:
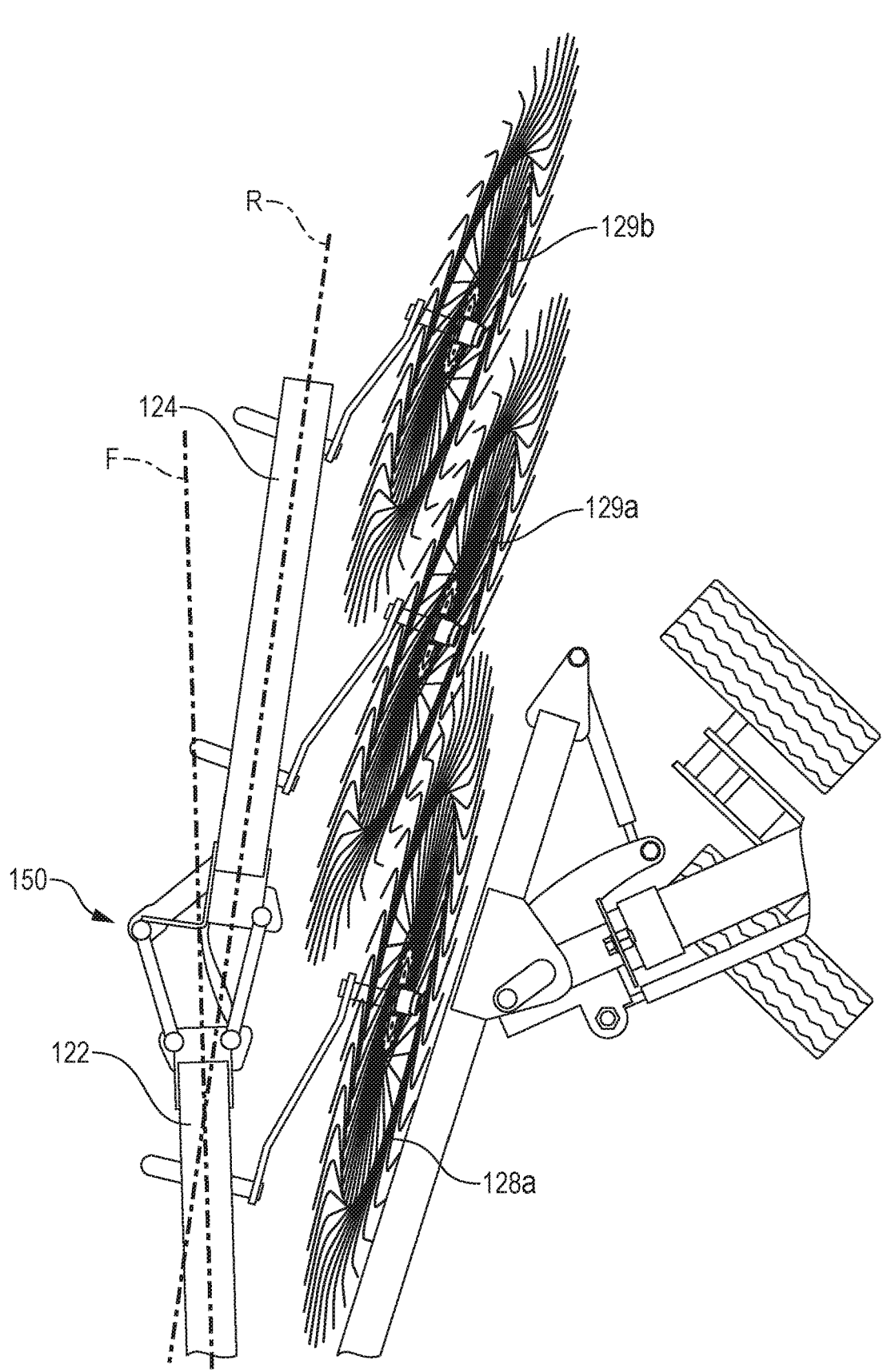
FIG. 10 is an image of a top view of an example rake frame subassembly with a multi-hinge, hinge joint in accordance with some embodiments.
Figure 12:
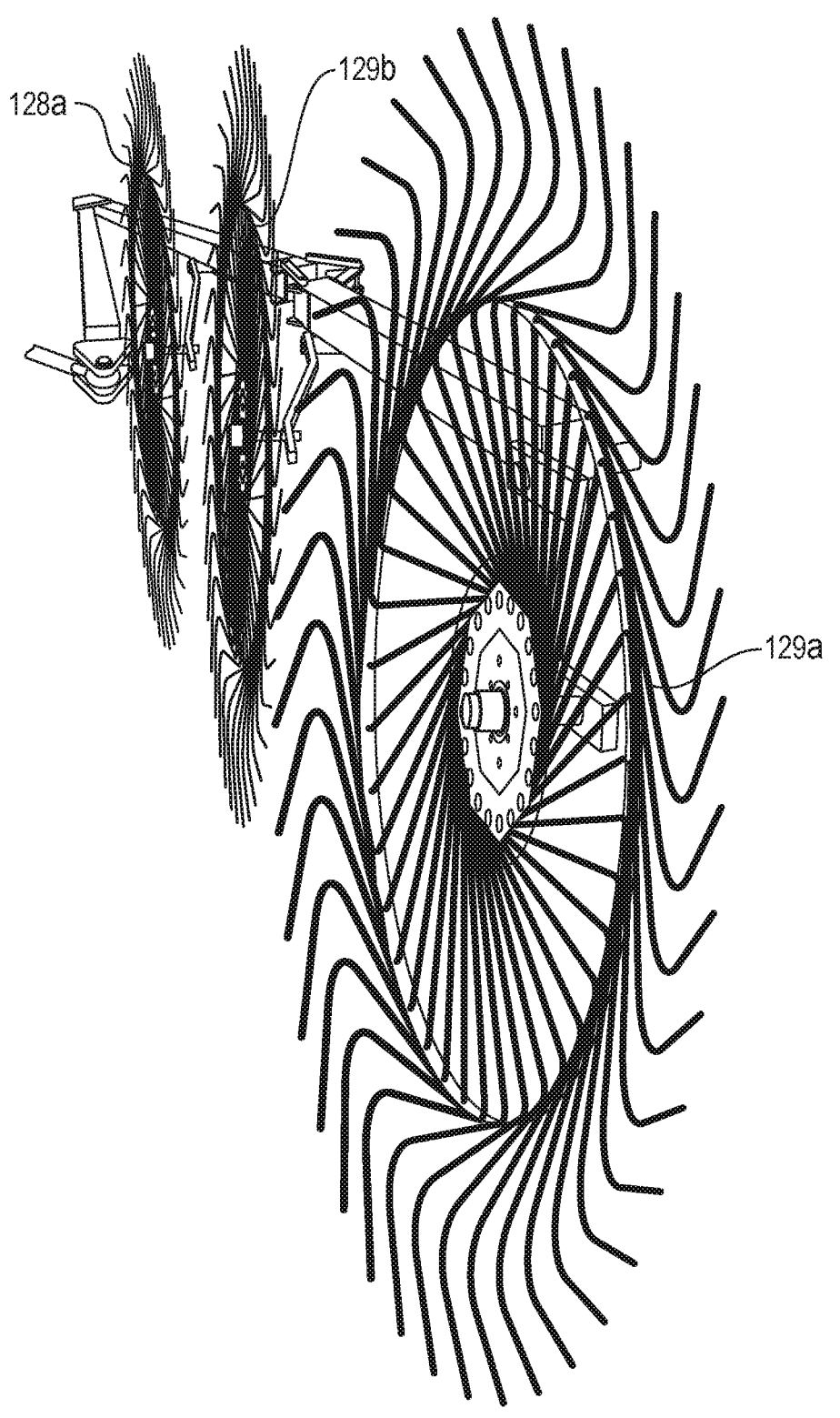
FIG. 12 is an image of a perspective view of the example rake frame subassembly illustrating spacing between the rake wheels.

An example rake frame subassembly was constructed and is shown in FIGS. 10 and 12. The example rake frame subassembly included a front frame section 122 supporting one front rake wheel 128A connected to a rear frame section 124 supporting two rear rake wheels 129*a* and 129*b*. The front frame section 122 and the rear frame section 124 were connected by a hinge joint 150. FIG. 10 is an image of a top view of the example rake frame subassembly in a configuration with 10 degree tilt inward of the rear frame section longitudinal axis R relative to the front frame section longitudinal axis F.

Figure 11:
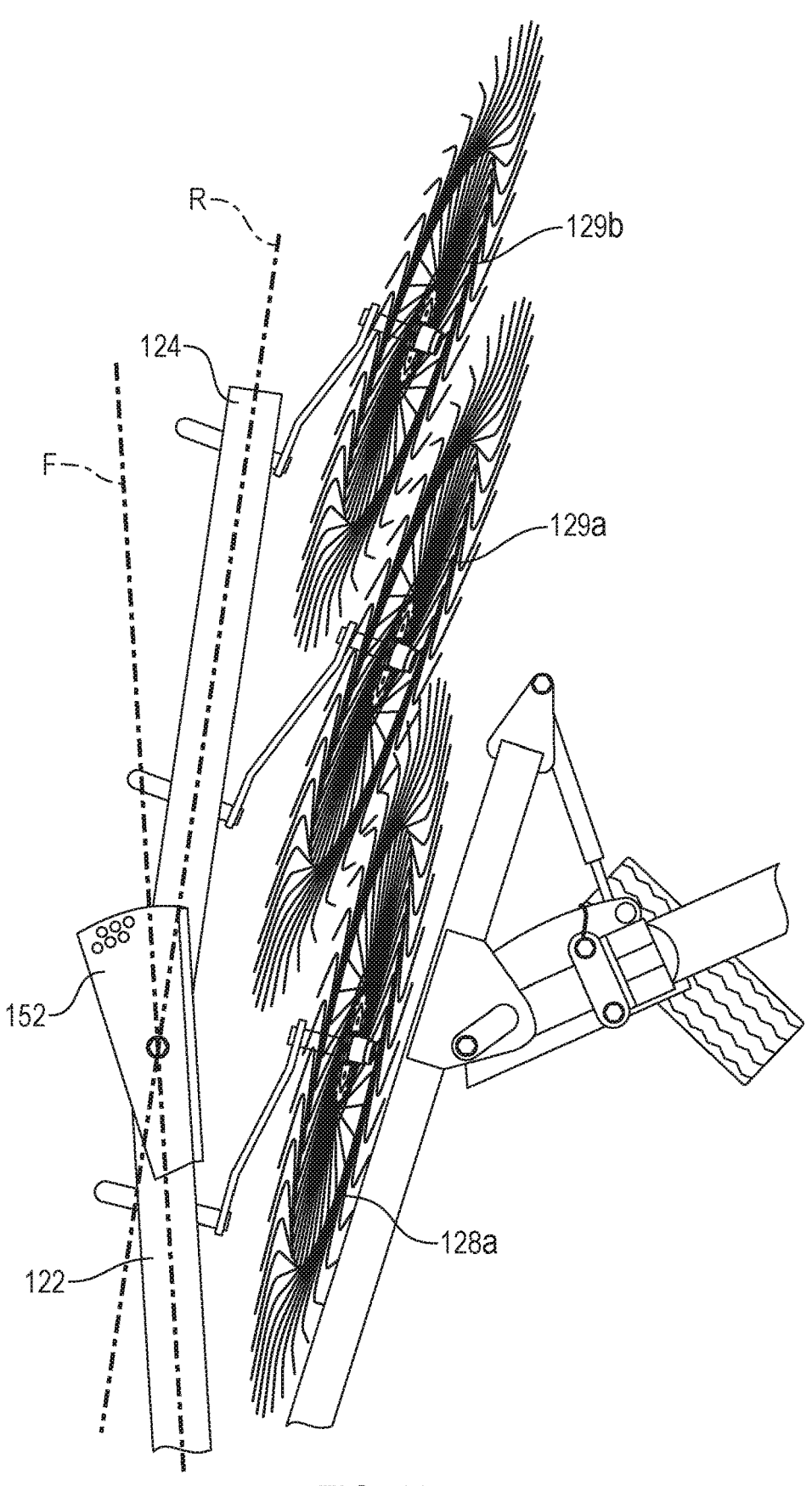
FIG. 11 is an image of a top view of a comparison rake frame subassembly with a single hinge, hinge joint for comparison.
Figure 13:
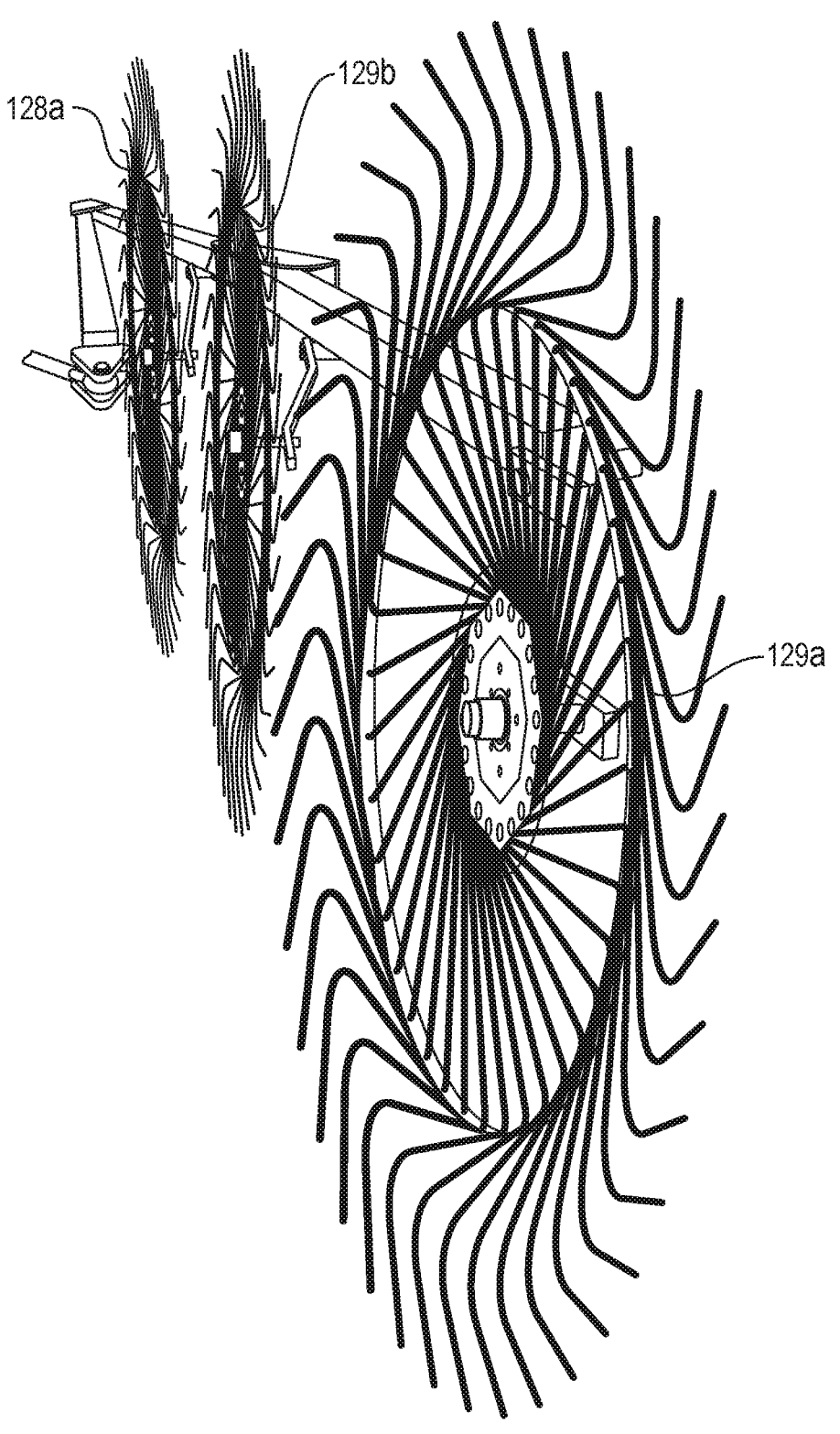
FIG. 13 is an image of a perspective view of the comparison rake frame subassembly illustrating spacing between the rake wheels.

A comparison rake frame subassembly was constructed and is shown in FIGS. 11 and 13. The comparison rake frame subassembly included a front frame section 122' supporting one front rake wheel 128A connected to a rear frame section 124' supporting two rear rake wheels 129*a* and 129*b*. The front frame section 122' and the rear frame section 124' were connected by a simple single pivot joint 152. FIG. 11 is an image of a top view of the comparison rake frame subassembly in a configuration with a 10 degree inward tilt inward of the rear frame section longitudinal axis R relative to the front frame section longitudinal axis F.

FIGS. 12 and 13 are images of the example rake frame subassembly and the comparison rake frame assembly, respectively, looking along the rear and front frame segments with the angle of tilt between rear and front frame segments still at 10 degrees.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

LIST OF REFERENCE NUMBERS

10 hay rake or carted wheel rake
12 center frame
14*a* first wing
14*b* second wing
20 rake frame subassembly
20*a* first rake subassembly
20*b* second rake subassembly
22 front frame section
23 trailing end of front frame section
24 rear frame section
25 leading end of rear frame section
28*a*, 28*b*, 28*c*, 28*d* front rake wheels
29*a*, 29*b* rear rake wheels
30 hinge joint
31 first hinge
32 second hinge
33 third hinge
34 fourth hinge
41 first hinge plate
42 second hinge plate
43 third hinge plate
44 fourth hinge plate
46 inner control arms
47*a* first end of inner control arms
47*b* second end of inner control arms
48 outer control arms
49*a* first end of outer control arms
49*b* second end of outer control arms
50 turnbuckle
52*a*, 52*b* front rake arms
54*a*, 54*b* rear rake arms
122 front frame section of example rake frame subassembly
122' front frame section of comparison rake frame subassembly
124 rear frame section of example rake frame subassembly
124' rear frame section of comparison rake frame subassembly
128*a* front wheel rake
129*a*, 129*b* rear wheel rakes
150 pivot joint of example rake frame subassembly
156 simple single pivot of comparison rake frame subassembly

What is claimed is:

1. A rake frame subassembly comprising:
a front frame section configured to support at least one front rake wheel;
a rear frame section configured to support at least one rear rake wheel; and
a hinge joint having:
a first hinge and a second hinge, each connected to, attached to, integral with, configured to connect to, or configured to be integral with the front frame section; and
a third hinge and a fourth hinge, each connected to, attached to, integral with, configured to connect to, or configured to be integral with the rear frame section, each of the first hinge, second hinge, third hinge, and fourth hinge having an axis of rotation that does not overlay an axis of rotation of others of the first hinge, second hinge, third hinge, and fourth hinge,
the hinge joint comprising an adjustment element configured to adjust a distance between a rotation axis of the first hinge and a rotation axis of the fourth hinge,
the hinge joint connecting or configured to connect the front frame section and the rear frame section and configured to:
enable both an orientation of the rear frame section relative to the front frame section and a position of the rear frame section relative to the front frame section to be adjusted by changing an orientation of the rear frame section relative to the front frame section and translating the rear frame section relative to the front frame section using the adjustment element; or
enable a position of the rear frame section relative to the front frame section to be adjusted by translating the rear frame section relative to the front frame section using the adjustment element.

2. The rake frame subassembly of claim 1, wherein the hinge joint connects or is configured to connect a trailing end of the front frame section and a leading end of the rear frame section.

3. The rake frame subassembly of claim 1,
wherein the hinge joint comprises:
a first hinge plate connected to, attached to, integral with, configured to connect to, or configured to be integral with an inner side of front frame section at the trailing end;
a second hinge plate connected to, attached to, integral with, configured to connect to, or configured to be integral with an outer side of the front frame section at the trailing end;
a third hinge plate connected to, attached to, integral with, configured to connect to, or configured to be integral with an inner side of the rear frame section at the leading end;
a fourth hinge plate connected to, attached to, integral with, configured to connect to, or configured to be integral with an outer side of the rear frame section at the leading end;
at least one inner control arm, a first end of the at least one inner control arm rotatably connected with or configured to rotatably connect with the first hinge plate at the first hinge, a second end of the at least one control arm rotatably connected with or configured to rotatably connect with third hinge plate at the third hinge; and
at least one outer control arm, a first end of the at least one outer control arm rotatably connected with or configured to rotatably connect with the second hinge plate at the second hinge, and a second end of the at least one outer control arm rotatably connected with or configured to rotatably connect with the fourth hinge plate at the fourth hinge.

4. The rake frame subassembly of claim 3, wherein the at least one inner control arm comprises a pair of inner control arms oriented parallel to each other; and
wherein the at least one outer control arm comprises a pair of outer control arms oriented parallel to each other.

5. The rake frame subassembly of claim 3, wherein the first hinge plate and the second hinge plate are attached to each other or integral with each other, and wherein the third hinge plate and the fourth hinge plate are attached to each other or integral with each other.

6. The rake frame subassembly of claim 3, further comprising:

a first hinge pin associated with the first hinge;

a second hinge pin associate with the second hinge;

a third hinge pin associated with the third hinge; and a fourth hinge pin associated with the fourth hinge.

7. The rake frame subassembly of claim 6, wherein each of the first hinge pin, the second hinge pin, the third hinge pin, and the fourth hinge pin is a screw or a bolt.

8. The rake frame subassembly of claim 3, wherein a first distance between the first hinge and the second hinge is greater than a second distance between the third hinge and the fourth hinge.

9. The rake frame subassembly of claim 3, wherein a first distance between the first hinge and the second hinge is the same as a second distance between the third hinge and the fourth hinge.

10. The rake frame subassembly of claim 1, wherein the adjustment element comprises one or more of a turnbuckle, a hydraulically controlled element, and an electronically controlled element.

11. A rake frame assembly comprising:

the rake frame subassembly of claim 1;

one or more front rake wheel arms attached to or configured to attach to an inner side of the front rake section or to an outer side of the front frame section; and one or more rear rake wheel arms attached to or configured to attach to the inner side of the rear frame section or to the outer side of the rear frame section.

12. The rake frame assembly of claim 11, further comprising:

one or more front rake wheels corresponding to the one or more front rake wheel arms; and one or more rear rake wheels corresponding to the one or more rear rake wheel arms.

13. The rake frame assembly of claim 11, wherein the one or more front rake wheels comprise a plurality of front rake wheels; or wherein the one or more rear rake wheels comprise a plurality of rear rake wheels; or wherein the one or more front rake wheels comprise a plurality of front rake wheels and the one or more rear rake wheels comprise a plurality of rear rake wheels.

14. A hinge joint configured to connect a trailing end of a front frame section of a rake frame subassembly and a leading end of a rear frame section of the rake frame subassembly, the hinge joint having a first hinge, a second hinge, a third hinge, and a fourth hinge and comprising:

a first hinge plate configured to connect to or be attached to an inner side of front frame section at the trailing end;

a second hinge plate configured to connect to or be attached to an outer side of the front frame section at the trailing end;

a third hinge plate configured to connect to or be attached to the inner side of the rear frame section at the leading end;

a fourth hinge plate configured to connect to or be attached to the outer side of the rear frame section at the leading end;

at least one inner control arm, a first end of the at least one inner control arm rotatably connected with or configured to rotatably connect with the first hinge plate at the first hinge, a second end of the at least one control arm rotatably connected with or configured to rotatably connect with the third hinge plate at the third hinge;

at least one outer control arm, a first end of the at least one outer control arm rotatably connected with or configured to rotatably connect with the second hinge plate at the second hinge, and a second end of the at least one outer control arm rotatably connected with or configured to rotatably connect with the fourth hinge plate at the fourth hinge; and an adjustment element configured to adjust a distance between the first hinge and the fourth hinge, thereby adjusting a position of the rear frame section relative to the front frame section, or thereby adjusting both an orientation of the rear frame section relative to the front frame section and a position of the rear frame section relative to the front frame section.

15. The hinge joint of claim 14, wherein the at least one inner control arm comprises a pair of inner control arms oriented parallel to each other; and wherein the at least one outer control arm comprises a pair of outer control arms oriented parallel to each other.

16. The hinge joint of claim 14, wherein the first hinge plate and the second hinge plate are attached to each other or integral with each other, and wherein the third hinge plate and the fourth hinge plate are attached to each other or integral with each other.

17. The hinge joint of claim 14, further comprising:

a first hinge pin associated with the first hinge;

a second hinge pin associate with the second hinge;

a third hinge pin associated with the third hinge; and a fourth hinge pin associated with the fourth hinge.

18. The hinge joint of claim 14, wherein a first distance between the first hinge and the second hinge is greater than a second distance between the third hinge and the fourth hinge.

19. The hinge joint of claim 14, wherein a first distance between the first hinge and the second hinge is the same as a second distance between the third hinge and the fourth hinge.

20. The hinge joint of claim 14, wherein the adjustment element comprises one or more of a turnbuckle, a hydraulically controlled element, and an electronically controlled element.

* * * * *